UNITED STATES PATENT OFFICE.

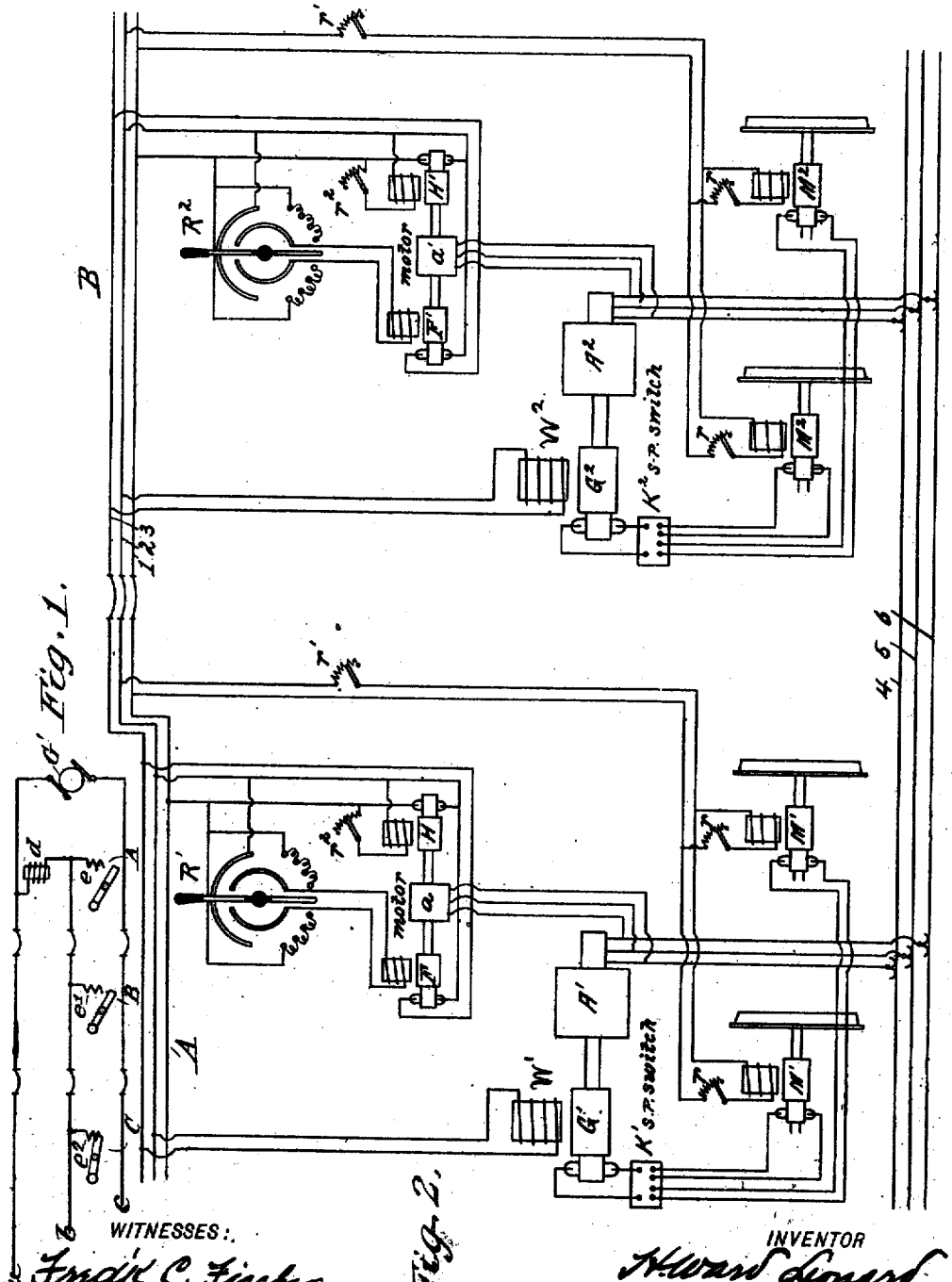

HARRY WARD LEONARD, OF BRONXVILLE, NEW YORK.

MULTIPLE CONTROL SYSTEM.

1,003,927.  Specification of Letters Patent.  Patented Sept. 19, 1911.

Original application filed January 24, 1901, Serial No. 44,565. Divided and this application filed March 22, 1902, Serial No. 100,142. Renewed July 6, 1906. Serial No. 325,000.

*To all whom it may concern:*

Be it known that I, HARRY WARD LEONARD, a citizen of the United States, residing at Bronxville, in the county of Westchester and State of New York, have invented a certain new and useful Improvement in Multiple Control Systems, of which the following is a description.

My invention relates to electric transmission of power, and my principal object is the operation of electric translating devices in such a way that one or more of such devices can be controlled from several different points.

The present application is a division of my application filed January 24th, 1901, Patent No. 696,247, issued March 25, 1902. The claims of the present application are directed to combinations not claimed in said patent. Certain of the combinations claimed herein relate to a variable voltage source of control energy with means responsive to variations of voltage of the control energy to control a multiple unit system.

One of the most important applications of my present invention is the simultaneous control of a plurality of electric motors located upon different cars composing a train, so that from any one of several different cars the motors can be operated at any desired speed and in either direction, while at the same time they will operate in harmony, dividing the load approximately in proportion to their capacity. My invention is also capable of use in the operation of electric motors used for other purposes as for example in connection with pumps, swinging bridges, elevators, cranes, guns, propellers, rudders, metal rolls, moving side-walks, printing presses, cable power transmitting devices, as well as valves and governors of engines, turbines, etc. My invention is, however, not limited to the control of electric motors, but may be utilized in controlling the voltage or the current supplied to other electric translating devices, such as electric lights, electric heaters, rheostats, circuit controllers, electric furnaces, storage batteries, electrolytic cells, and in fact mechanism in general operated or controlled from several points through the agency of electric energy.

The present application illustrates the principle of my invention applied more particularly to a system wherein the motors or other translating devices are connected to a system of three conductors which are connected through the regulating machines with the main source of supply.

In Figure 1 is illustrated the connections which may be employed when the current through the generator field or other device is to be controlled from several different points but not reversed; and Fig. 2 illustrates two connected cars, each equipped with two propelling motors, a dynamo electric generator, and an exciter of variable and reversible electro-motive force, the original source of current being indicated as a 3-phase circuit.

In Fig. 1, I illustrate an arrangement of circuits whereby a translating device, illustrated diagrammatically as a magnet $d$, may be controlled from any one of a number of points A, B or C, which may correspond with the cars of Fig. 2. A generator G' driven from any source of power, as for example by a motor receiving current from a suitable trolley system, supplies current to wires $a$ and $c$, which are connected together from car to car. Arranged on each of the cars is a rheostat $e$ $e'$ $e^2$ respectively, connected between the wire $c$ and a wire $b$ extending parallel therewith and between which and the wire $a$ the translating device $d$ is connected in parallel. It will be seen that by operating either of the rheostats $e$, $e'$ or $e^2$, the others being open, the current supplied to the translating device can be increased or diminished at will to properly control the latter and any devices affected by it.

In Fig. 2, I illustrate means for controlling a plurality of motors or other electric translating devices, both as to their speed and as to the direction of rotation of their armatures or other movable elements, from any point on a circuit of three wires. The controlling motor $a$ is of any suitable type, electrical or mechanical, but for the purpose of illustration I have represented it as a 3-phase motor supplied by a circuit $4'-5'-6'$. The motor $a$ drives the armature of a small shunt dynamo H, which supplies current to the field of a controlling continuous-current generator F through a reversing rheostat R', whereby the electromotive force and direction of current supplied by the exciter H to the field of the generator F may be varied or reversed, as may be desired. Thus, the armature of the generator F will be driven by the motor $a$ at a practically constant speed in a field whose strength can be varied and its polarity reversed at will. The current, therefore, supplied by the generator F to the controlling circuit or wires 2, 3 will be of a variable and reversible electromotive force. The car B is likewise provided with an operating motor $a'$ driving a shunt dynamo H', which supplies current to the field of a controlling continuous-current generator F' through a reversing rheostat $R^2$, as with the car A. G' $G^2$ represent two continuous-current generators driven from any suitable source of power, electrical or mechanical, and which may be separated to any desired extent, one for example, being mounted on one of the cars A, constituting a train, and the other on another of such cars, B, assuming the invention to be utilized for the controlling of the propelling motors of a train composed of a series of motor cars. Thus, in Fig. 2, I illustrate the generator G' on the car A as being operated by a 3-phase motor A', and the generator $G^2$ on the car B as being operated by a 3-phase motor $A^2$. The electromagnetic field windings W', $W^2$ of the continuous current generators G' $G^2$ are connected in parallel with the controlling circuit 2—3, whereby, in responding to variation of voltage on the controlling circuit 2—3, the strength of such fields can be simultaneously varied and their polarity simultaneously reversed at will to permit such generators to supply currents of corresponding electromotive force and direction at all times. The armature of the generator G' is connected by a series parallel switch K' with the armatures of the motors M' M', and the armature of the generator $G^2$ is connected by a series parallel switch $K^2$ with the armatures of the propelling motors $M^2$ $M^2$. The series parallel controlling switches K' and $K^2$ are of any common form, by means of which the armatures of the motors M' M' or $M^2$ $M^2$ may be connected in series or in parallel with each other. The fields of the motors M' and $M^2$ are connected in parallel with a circuit 1—2 supplied with current of constant electromotive force from the exciter H, as shown. In the field of each of the propelling motors M' M' or $M^2$ $M^2$ is preferably placed a small controlling rheostat $r$, by means of which each of the motors may be adjusted so as to always assume its proportionate share of the load, and by means of which the adjustment so effected can be varied when for any cause that is necessary, as for example when the wheels driven by that particular motor become worn and of reduced diameter. A controlling rheostat $r'$ may also be mounted in the common circuit leading to the fields of the two motors M' M' or $M^2$ $M^2$ for each locomotive, and by means of which both motors may simultaneously be varied when desired, in order that one locomotive as a unit may assume its desired or proportionate share of the load imposed on the train. A small rheostat $r^2$ in the field circuit of the exciter H is also employed for the purpose of controlling the electro-motive force thereof.

In operation, assuming the motors $a$ $a'$ and generators G' $G^2$ to be rotating at the proper approximately constant speed, and the handle of each of the rheostats R' $R^2$ to be in its central or neutral position, current of constant electromotive force will be supplied, for example, by the exciter H to the circuit 1—2 to energize the fields of the propelling motors M' $M^2$, the brushes of the exciter H' being raised. No current will, however, energize the fields of the controlling generators F F', and in consequence no current will be generated in the controlling circuit 2—3, so that the field magnets W', $W^2$, of the generators G' and $G^2$ will not be excited, said generators will generate no current, and the motors M' $M^2$ will therefore be at rest. By gradually moving the handle of the rheostat R' for example, current in one direction or the other will be permitted to energize the field of the controlling generator F with the desired polarity and with gradually increasing strength, whereby a current of gradually increasing electromotive force will be generated in the controlling circuit 2—3. The strength of the electromagnetic field windings of the generators G' and $G^2$ will be correspondingly increased, and a current of gradually increasing electromotive force will be generated by the generators G' and $G^2$ to supply the motors M' and $M^2$, which will start to operate at a gradually increasing speed. In this way, obviously, the speed of the motors M' and $M^2$ can be simultaneously controlled and the direction of their armatures reversed by either the rheostat R' or $R^2$, or by means of any other rheostat having the capacity of varying the electromotive force and the direction of current supplied to the controlling circuit 2—3, it being understood that the rheostats which are not operating are maintained in their neutral position and that the adjacent exciting generators F', H', etc. are out of circuit. Obviously, by connecting to the circuits 1—2 and 2—3 a controlling apparatus comprising a motor $a$, an exciter H, a controlling generator F, and a rheostat R'; as explained, the speed of the propelling motors can be simultaneously controlled and the direction of rotation of their armatures reversed from any other point on the circuit composed of the three wires 1, 2, 3.

Instead of varying the electromotive force of the controlling generator F by producing variations in the field strength thereof, it will of course be understood that the result can be secured in other ways familiar to those skilled in the art, as for example by varying the speed of rotation of the armature of the controlling generator or by reversing the sense of rotation thereof when a reversal of the polarity of the generators G' and G² is desired.

In some instances the machines A' A² and G' G² need not necessarily be separate machines, since any known form of electric energy transformers may be employed, which will receive electric energy in any suitable form and deliver suitable electric energy of controllable electromotive force, instead of the separate machines. In some instances, instead of employing dynamo electric generators for exciting the fields of the propelling motors or for supplying other circuits used in the apparatus, other forms of current supply can be utilized, as for example primary or secondary batteries, thermo-electric generators, or magneto machines. It will furthermore be understood that other forms of generators and motors can be utilized from those shown, as for example the generators may be compound wound and the motors may be series wound. Furthermore, it will be obvious that all known forms of series parallel control may be used in connection with the motor armatures. It will also be understood that instead of reversing the rotation of the motor armatures by reversing the current in the supplying generators therefor, the current supplied by the generators may be maintained in a constant direction and a reversing switch be interposed between the same and the motor armature for reversing the current in the latter, or the field of the motor may be reversed. It will also appear from my description that instead of operating the several controlling motors or the motors for driving the generators by electric energy, mechanical motors for the purpose may be utilized, and that instead of using a 3-phase current as explained, a single-phase or any other form of alternating current or electric current adapted to produce another by induction can be employed.

What I claim is:

1. A system of three conductors extending through a train of cars and connected between the cars, a source of constant electromotive force connected between two of the said conductors, a translating device connected between one of the said two conductors and the third conductor, and means upon several cars by which the third conductor and the other of said two conductors can be connected together through a device which will enable the operator to vary at will the electro-motive force at the terminals of the translating device.

2. A system of three conductors, a source of constant electro-motive force connected between two of the said conductors, the field winding of a dynamo electric machine connected between one of the said two conductors and the third conductor, and means at two or more different points for connecting said third conductor with the other of the said two conductors.

3. A system of three conductors an electrical translating device connected across one pair of said conductors, and means connected across another pair of said conductors at several different points, whereby at any one of said points the electro-motive force at the terminals of said translating device may be varied at the will of the operator.

4. A system of three conductors an electro-magnet connected across one pair of said conductors, and means connected across another pair of said conductors at several different points, whereby at any one of said points the magnetism of said magnet may be varied at the will of the operator.

5. A system of three conductors two independent electrical translating devices connected across one pair of said conductors, and means connected across another pair of said conductors at several different points, whereby at any one of said points the electro-motive force at the terminals of said translating devices may be similarly varied at the will of the operator.

6. A system of three conductors two independent electro-magnets connected across one pair of said conductors, and means connected across another pair of said conductors at several different points, whereby at any one of said points the magnetism of said magnets may be similarly varied at the will of the operator.

7. A system of three conductors an electrical translating device connected across one pair of said conductors, and means connected across another pair of said conductors at several different points, whereby at any one of said points the electro-motive force at the terminals of said translating device may be varied or reversed at the will of the operator.

8. A system of three conductors an electro-magnet connected across one pair of said conductors, and means connected across another pair of said conductors at several different points, whereby at any one of said points the magnetism of said magnet may be varied and reversed at the will of the operator.

9. A system of three conductors two independent electrical translating devices connected across one pair of said conductors, and means connected across another pair of said conductors at several different points, whereby at any one of said points the electromotive force at the terminals of said translating device may be similarly varied and reversed at the will of the operator.

10. A system of three conductors two independent electro-magnets connected across one pair of said conductors, and means connected across another pair of said conductors at several different points, whereby at any one of said points the magnetism of said magnets may be similarly varied and reversed at the will of the operator.

11. In an electric railway system, two or more cars coupled together, a series of conductors extending through the cars, one or more driving motors for said cars, a dynamo electric machine supplying energy to said motor or motors, the field winding of said machine being connected across one pair of said series of conductors, and means connected across another pair of said conductors whereby the strength of said field winding may be varied to vary the energy supplied to said motor or motors.

12. In an electric railway system, two or more cars coupled together, a series of conductors extending through the cars, one or more driving motors for said cars, a dynamo electric machine supplying energy to said motor or motors, the field winding of said machine being connected across one pair of said series of conductors, and separate means on each car connected across another pair of said conductors whereby from any one point the strength of said field winding may be varied to vary the energy supplied to said motor or motors.

13. In an electric railway system, two or more cars coupled together, a series of conductors extending through the cars, one or more driving motors for said cars, a dynamo electric machine supplying energy to said motor or motors, the field winding of said machine being connected across one pair of said series of conductors, and means connected across another pair of said conductors whereby the strength of said field winding may be varied or reversed in sense to vary or reverse the energy supplied to said motor or motors.

14. In an electric railway system, two or more cars coupled together, a series of conductors extending through the cars, one or more driving motors for said cars, a dynamo electric machine supplying energy to said motor or motors, the field winding of said machine being connected across one pair of said series of conductors, and separate means on each car connected across another pair of said conductors whereby from any one point the strength of said field winding may be varied or reversed in sense to vary or reverse the energy supplied to said motor or motors.

15. In an electric railway system, two or more cars coupled together, a series of conductors extending through the cars, one or more driving motors for said cars, a dynamo electric machine on each of said cars supplying energy to said motors, the field windings of said machines being connected across one pair of said series of conductors, and means connected across another pair of said conductors whereby the strength of said field windings may be similarly varied to vary the energy supplied to said motors.

16. In an electric railway system, two or more cars coupled together, a series of conductors extending through the cars, one or more driving motors for said cars, a dynamo electric machine on each of said cars supplying energy to said motors, the field windings of said machines being connected across one pair of said series of conductors, and means connected across another pair of said conductors, whereby the strength of said field windings may be similarly varied or reversed in sense to vary or reverse the energy supplied to said motors.

17. In an electric railway system, two or more cars coupled together, a series of conductors extending through the cars, one or more driving motors for said cars, a dynamo electric machine on each of said cars supplying energy to said motors, the field windings of said machines being connected across one pair of said series of conductors, and separate means on each car connected across another pair of said conductors, whereby from any one point the strength of said field windings may be similarly varied to vary the energy supplied to said motors.

18. In an electric railway system, two or more cars coupled together, a series of conductors extending through the cars, one or more driving motors for said cars, a dynamo electric machine on each of said cars supplying energy to said motors, the field windings of said machines being connected across one pair of said series of conductors, and separate means on each car connected across another pair of said conductors, whereby from any one point the strength of said field windings may be similarly varied or reversed in sense to vary or reverse the energy supplied to said motors.

19. In an electric power system, three conductors, one or more motors, a dynamo electric machine supplying energy thereto, a divided source of electric energy connected to said three conductors, the field winding of said dynamo electric machine being connected across one pair of said conductors, and means for varying the electric-motive force across said pair of conductors.

20. In an electric power system, three conductors, one or more motors, a dynamo electric machine supplying energy thereto, a divided source of electric energy connected to said three conductors, the field winding of said dynamo electric machine being connected across one pair of said conductors, and means for varying or reversing the electromotive force across said pair of conductors.

21. In an electrical power system, three conductors, one or more motors, a dynamo electric machine supplying energy thereto, a divided source of electric energy connected to said three conductors, the field winding of said dynamo electric machine being connected across one pair of said conductors and the field winding or windings of said motor or motors being connected across another pair of said conductors, and means for varying the electro-motive force across the first named pair of conductors.

22. In an electric power system, three conductors, one or more motors, a dynamo electric machine supplying energy thereto, a divided source of electric energy connected to said three conductors, the field winding of said dynamo electric machine being connected across one pair of said conductors and the field winding or windings of said motor or motors being connected across another pair of said conductors, and means for varying or reversing the electro-motive force across the first named pair of conductors.

23. In an electrical power system, three conductors, one or more motors, a dynamo electric machine supplying energy thereto, two divided sources of electric energy connected to said three conductors, the field winding of said dynamo electric machine being connected across one pair of said conductors, and means for varying said divided sources of energy independently of each other to vary the electro-motive force across said pair of conductors.

24. In an electrical power system, three conductors, one or more motors, a dynamo electric machine supplying energy thereto, two divided sources of electric energy connected to said three conductors, the field winding of said dynamo electric machine being connected across one pair of said conductors, and means for varying or reversing said divided sources of energy independently of each other to vary or reverse the electro-motive force across said pair of conductors.

25. In an electrical power system, three conductors, one or more motors, a dynamo electric machine supplying energy thereto, two divided sources of electric energy connected to said three conductors, the field winding of said dynamo electric machine being connected across one pair of said conductors and the field winding or windings of said motor or motors being connected across another pair of said conductors, and means for varying said divided sources of energy independently of each other to vary the electro-motive force across the first named pair of conductors.

26. In an electric railway system, two or more cars coupled together, three conductors extending through the cars, one or more driving motors for said cars, a dynamo electric machine supplying energy thereto, a divided source of electric energy connected to said three conductors, the field winding of said dynamo electric machine being connected across one pair of said conductors, and means for varying the electro-motive force across said pair of conductors.

27. In an electric railway system, two or more cars coupled together, three conductors extending through the cars, one or more driving motors for said cars, a dynamo electric machine supplying energy thereto, a divided source of electric energy connected to said three conductors, the field winding of said dynamo electric machine being connected across one pair of said conductors, and means for varying or reversing the electro-motive force across said pair of conductors.

28. In an electric railway system, two or more cars coupled together, three conductors extending through the cars, one or more driving motors for said cars, a dynamo electric machine supplying energy thereto, a divided source of electric energy connected to said three conductors, the field winding of said dynamo electric machine being connected across one pair of said conductors and the field winding or windings of said motor or motors being connected across another pair of said conductors, and means for varying the electro-motive force across the first named pair of conductors.

29. In an electric railway system, two or more cars coupled together, three conductors extending through the cars, one or more driving motors for said cars, a dynamo electric machine supplying energy thereto, a divided source of electric energy connected to said three conductors, the field winding of said dynamo electric machine being connected across one pair of said conductors, and the field winding or windings of said motor or motors being connected across another pair of said conductors, and means for varying or reversing the electro-motive force across the first named pair of conductors.

30. In an electric railway system, two or more cars coupled together, three conductors extending through the cars, one or more driving motors for said cars, a dynamo electric machine supplying energy thereto, a divided source of electric energy on each car connected to said three conductors, the field winding of said dynamo electric machine being connected across one pair of said conductors, and means on each car for varying the electro-motive force across said pair of conductors.

31. In an electric railway system, two or more cars coupled together, three conductors extending through the cars, one or more driving motors for said cars, a dynamo electric machine supplying energy thereto, a divided source of electric energy on each car connected to said three conductors, the field-winding of said dynamo electric machine being connected across one pair of said conductors, and means on each car for varying or reversing the electro-motive force across said pair of conductors.

32. In an electric railway system, two or more cars coupled together, three conductors extending through the cars, one or more driving motors on each car, a dynamo electric machine on each car supplying energy to the driving motor or motors, a divided source of electric energy connected to said three conductors, the field windings of said dynamo electric machines being connected across one pair of said conductors, and means for varying the electro-motive force across said pair of conductors.

33. In an electric railway system, two or more cars coupled together, three conductors extending through the cars, one or more driving motors on each car, a dynamo electric machine on each car supplying energy to the driving motor or motors, a divided source of electric energy connected to said three conductors, the field windings of said dynamo electric machines being connected across one pair of said conductors, and means for varying or reversing the electro-motive force across said pair of conductors.

34. In an electric railway system, two or more cars coupled together, three conductors extending through the cars, one or more driving motors on each car, a dynamo electric machine on each car supplying energy to the driving motor or motors, a divided source of electric energy on each car connected to said three conductors, the field windings of said dynamo electric machines being connected across one pair of said conductors, and means on each car for varying the electro-motive force across said pair of conductors.

35. In an electric railway system, two or more cars coupled together, three conductors extending through the cars, one or more driving motors on each car, a dynamo electric machine on each car supplying energy to the driving motor or motors, a divided source of electric energy on each car connected to said three conductors, the field windings of said dynamo electric machines being connected across one pair of said conductors, and means on each car for varying or reversing the electro-motive force across said pair of conductors.

36. In an electric railway system, a main source of alternating current, conductors extending therefrom along the railway, a car provided with means for making traveling contact with said conductors, an alternating current motor on said car, a dynamo electric machine driven by said motor, one or more driving motors for said car supplied with energy from said dynamo electric machine, a divided source of electric energy on the car, three conductors extending therefrom, the field winding of said dynamo electric machine being connected across one pair of said three conductors, and means for varying the electro-motive force across said pair of conductors.

37. In an electric railway system, a main source of alternating current, conductors extending therefrom along the railway, a car provided with means for making traveling contact therewith, an alternating current motor on said car, a dynamo electric machine driven by said motor, one or more driving motors for said car supplied with energy from said dynamo electric machine, a divided source of electric energy on the car, three conductors extending therefrom, the field winding of said dynamo electric machine being connected across one pair of said three conductors, and the field winding or windings of said driving motor or motors being connected across another pair of said three conductors, and means for varying the electro-motive force across the first-named pair of conductors.

38. In an electric railway system, a main source of alternating current, conductors extending therefrom along the railway, a car provided with means for making traveling contact therewith, an alternating current motor on said car, a dynamo electric machine driven by said motor, one or more driving motors for said car supplied with energy from said dynamo electric machine, a divided source of electric energy on the car comprising two dynamo electric machines having their armatures connected in series and driven by an alternating current motor, three conductors extending therefrom, the field winding of said first-named dynamo electric machine being connected across one pair of said three conductors, and means for varying the electro-motive force across said pair of conductors.

39. Two electric motors, a main source of electric energy, two dynamo electric machines, the armature of each being connected in series with the armature of one of said motors, a circuit to which the field windings of said dynamos are connected, and a controlling rheostat connected between the main source and said circuit and wherby the fields of said dynamos are varied to vary the energy developed by said dynamos.

40. Two electric motors, a main source of electric energy, two dynamo electric machines, the armature of each being connected in series with the armature of one of said motors, a circuit to which the field windings of said dynamos are connected, and a reversing rheostat connected between the main source and said circuit and wherebv the fields of said dynamos are varied or reversed to vary or reverse the energy developed by said dynamos.

41. Two electric motors, a main source of electric energy, two dynamo electric machines, the armature of each being connected in series with the armature of one of said motors, a circuit to which the field windings of said dynamos are connected, and two controlling rheostats connected between the main source and said circuit at different points and by either of which the fields of said dynamos are varied to vary the energy developed by said dynamos.

42. Two electric motors, a main source of electric energy, two dynamo electric machines, the armature of each being connected in series with the armature of one of said motors, a circuit to which the field windings of said dynamos are connected, and two reversing rheostats connected between the main source and said circuit at different points and by either of which the fields of said dynamos are varied or reversed to vary or reverse the energy developed by said dynamos.

43. In an electric railway system, a plurality of cars coupled together, a series of three conductors extending through the cars, devices located on each of said cars for propelling said cars, means for supplying energy to said devices, the said devices on each car comprising a winding connected across one pair of said conductors, and separate means on each of the said cars connected across another pair of said conductors whereby from any one point the current passing through said winding may be controlled.

44. The combination of a plurality of electrically propelled vehicles coupled together, a source of electromotive force, propelling electric motors on each of said vehicles, three conductors extending between said vehicles, the potentials of two of said conductors corresponding to those of the terminals of said source of electromotive force, means on each of said vehicles for affecting the potential of the third conductor, an electro-responsive device corresponding to each of said motors and connected between said third conductor and one of said other two conductors, whereby the said electro-responsive devices respond similarly and thereby similarly vary the energy supplied to the said motors.

45. The combination with a suitable controlling circuit, of a plurality of electromagnetic windings connected therewith and adapted to respond to variation of voltage, and means for varying and reversing at will the voltage impressed upon said controlling circuit without thereby altering the resistance of said controlling circuit.

46. The combination with a suitable controlling circuit, of a plurality of electromagnetic windings connected in parallel between the opposite mains of said circuit, and adapted to respectively respond to variation of voltage, and a controller for varying the voltage impressed upon said controlling circuit without thereby altering the resistance of said controlling circuit.

47. The combination with a suitable controlling circuit, of a plurality of electromagnetic windings connected therewith in parallel and adapted to respond to variations of voltage, and a suitable source of current supply having means for varying at will the voltage impressed thereby, the voltage impressed by said source being substantially unaffected by the internal resistance of said circuit.

48. The combination with a suitable controlling circuit, of a plurality of electromagnetic windings connected therewith and adapted to respond to variations of voltage, a dynamo electric generator having a separately excited field winding for supplying current to said circuit, and means for varying the voltage developed by said generator.

49. The combination with a suitable controlling circuit, of a plurality of electromagnetic windings connected in parallel with said circuit and adapted to respond to variations in voltage, a generator for supplying current to said circuit, and means for varying the voltage impressed by said generator.

50. The combination with a suitable controlling circuit, of a plurality of electromagnetic windings connected therewith and adapted to respond to variations of voltage, a dynamo electric generator having a separately excited field winding supplying current to said circuit, and a rheostat for varying the field of said generator.

51. The combination with a suitable alternating current supply circuit, of an energy transformer receiving alternating current from said supply circuit and delivering unidirectional energy, a controlling circuit supplied with such unidirectional energy, means for varying the voltage impressed upon said controlling circuit by said transformer, and a plurality of electromagnetic windings associated with said controlling circuit.

52. The combination of a supply circuit, means for receiving energy from said supply circuit and delivering energy in modified form, controlling means supplied with said modified energy, means for varying at will the voltage of the energy supplied, a plurality of devices associated with said controlling means and responsive to variations in said modified energy, and a translating device supplied by said devices.

53. The combination with a supply circuit, of a motor generator having the motor part thereof energized by said circuit, a controlling circuit connected with the armature of the generator part thereof, means for varying at will the output of said generator part, a plurality of electromagnetic devices associated with said controlling circuit and responsive to different voltages, and a translating device controlled by said devices.

54. In a multiple unit control system, an energy transformer on each of a plurality of units the primary of which is supplied with alternating current energy, a control circuit for the multiple unit system, a variable voltage source for supplying said control circuit, and means controlled by said circuit for changing the voltage of the secondary of each of said transformers.

55. The combination with a suitable supply circuit, of a controlling circuit, a plurality of electromagnetic windings connected to said controlling circuit and adapted to respond to variations in voltage, and means for varying at will the voltage and also the polarity of the energy generated in said controlling circuit.

56. The combination with a suitable controlling circuit, of means for varying at will the voltage impressed thereon without thereby altering the resistance of said controlling circuit, a plurality of electromagnetic windings connected in parallel to said controlling circuit, and suitable devices controlled by said electromagnetic windings.

57. In a multiple unit control system, a plurality of electric motors to be controlled, a controlling circuit, means for varying at will the voltage and also the polarity of the energy generated in said controlling circuit, and means controlled by said circuit to vary the speed and direction of rotation respectively of said motors.

58. The combination of a plurality of generating windings having separately excited field windings, a plurality of electric motors acting jointly upon a common load, the armatures of which motors are connected in series with each other and are supplied from said generating windings, and means for varying and reversing the voltage supplied by said generating windings for varying the speed and reversing the direction of rotation of said motors.

59. The combination with a suitable controlling circuit, of a plurality of electromagnetic windings connected therewith, a dynamo electric generator supplying current to said circuit and having a separately excited field winding, a rheostat for varying the field strength of said generator, an electric motor, and means affected by said windings for controlling the speed of said motor.

60. The combination with a supply circuit, of a motor-generator having the motor part thereof energized from said supply circuit, a controlling circuit connected with the armature of the generator part of said motor generator, suitable means for varying at will the voltage developed by said armature, a plurality of electromagnetic windings associated with said controlling circuit and responding in strength to the voltages developed by said armature, an electric motor, and means affected by said windings for controlling the speed of said motor.

61. The combination of a supply circuit, a motor generator supplied therefrom, a controlling circuit connected with the armature of said motor generator, a master-controller for controlling the voltage of said armature, a plurality of windings connected with said controlling circuit and responding to changes of voltage, and means comprising a translating device controlled by said windings.

62. The combination of a plurality of electrically propelled vehicles forming a train, a supply circuit on more than one of said vehicles, a motor generator on each of said vehicles having said supply circuit, a controlling circuit on more than one of said vehicles, means whereby any one of said motor generators may be operated from the supply circuit, means whereby all of said controlling circuits may be connected with the generator armature of any one of said motor generators, means for varying the voltage delivered by any of the said generator armatures, and means associated with said controlling circuits responding to variations of voltage and adapted to control the propelling electric motors of the train.

63. The combination of a source of electromotive force, a plurality of electric motors, a controlling circuit, means for controlling both the direction and speed of operation of said motors upon change of voltage and polarity of the current upon said controlling circuit, and means for varying at will the voltage and polarity of the current impressed upon said controlling circuit.

64. In an electric railway system, a plurality of cars coupled together to form a train, two supply conductors, a source of constant electromotive force connected between said two conductors, a third conductor which extends through the train, means on the train connected to said third conductor and to at least one of said two conductors for varying the potential of said third conductor, propelling motors, and electric means connected to said third conductor and to at least one of said two conductors for controlling the energy supplied to the propelling motors.

65. In an electric railway system, a plurality of cars coupled together to form a train, two supply conductors, a source of constant electromotive force connected between said two conductors, a third conductor which extends through the train, means located on a plurality of cars of the train connected to said third conductor and to at least one of said two conductors for varying the potential of said third conductor, propelling motors, and electric means connected to said third conductor and to at least one of said two conductors for controlling the speed of the propelling motors.

66. In an electric railway system, a plurality of cars coupled together to form a train, two supply conductors, a source of constant electromotive force connected between said two conductors, a third conductor which extends through the train, means located on a plurality of cars of the train connected to said third conductor and to at least one of said two conductors for varying the potential of said third conductor, propelling motors, and electric means connected to said third conductor and to at least one of said two conductors for controlling the forward and reverse motion of the propelling motors.

67. The combination of a system of three conductors, a source of constant electromotive force connected between two of said conductors, means for varying the potential of the third conductor, and electromagnetic means connected to said third conductor and to at least one of said two conductors and subjected to the variable electromotive force.

68. The combination of a system of three conductors, a source of constant electromotive force connected between two of said conductors, means connected to at least one of said two conductors for varying the potential of the third conductor with reference thereto, and electromagnetic means connected to said third conductor and to at least one of said two conductors and subjected to the variable electromotive force.

69. The combination of three conductors, a source of constant electromotive force connected between two of said conductors, means connected to at least one of said two conductors and to said third conductor for varying the potential of the third conductor with reference thereto, an electric motor, and electromagnetic controlling means for varying the speed of said motor connected to said third conductor and to at least one of said two conductors.

70. The combination of three conductors, a source of constant electromotive force connected between two of said conductors, means connected to at least one of said two conductors and to said third conductor for varying the potential of the third conductor with reference thereto, a plurality of electric motors, and electric controlling means for simultaneously varying the speed of said motors, said controlling means being connected to said third conductor and to at least one of said two conductors.

71. The combination of a source of constant electromotive force and supply conductors therefrom, a third conductor, a plurality of devices connected to said source and to said third conductor, each of said devices being adapted to vary the potential of said third conductor with reference to the potential of the other conductors and said devices being located at different points, an electric motor, and electromagnetic controlling means for varying the speed of said motor connected to said third conductor and to said source.

72. The combination of a source of alternating current energy, moving contacts for leading energy from said source upon an electrically propelled vehicle, electromagnetic means on said vehicle supplied with alternating current energy from said source, means for varying at the will of the operator the electromotive force delivered by said first named means, a plurality of electric controlling means subjected to said variable electromotive force, and a plurality of motors controlled by said latter means.

73. The combination of a source of alternating current energy, moving contacts for leading energy from said source upon a train comprising a plurality of electrically propelled vehicles, means for transforming said alternating current energy into energy the electromotive force of which is variable at the will of the operator, a control circuit extending through the train subjected to said variable electromotive force, a plurality of means on different cars of the train affected by said control circuit, and electric motors controlled by said latter means.

74. A system of motor control, comprising a motor, a generator supplying the armature of said motor, an exciter for the generator field, and means for varying and reversing the field strength of said exciter.

75. A motor control system, comprising an electric motor, a generator supplying the armature of said motor, separate sources of electromotive force for supplying the field windings of said generator and said motor respectively, and means for varying and reversing the electromotive force of the source which supplies the generator field.

76. A system of motor control, comprising a motor, a generator supplying the armature thereof, a separate source of electromotive force supplying the field of the generator, and means for varying and reversing the electromotive force of said separate source.

77. A motor control system, comprising an electric motor, a generator supplying the armature thereof, an exciter for the generator field, and means for reversing the electromotive force of said exciter.

78. A motor control system comprising a motor, a generator supplying the armature of said motor, two independent sources of electromotive force supplying the field windings of said generator and said motor respectively, and means for varying the electromotive forces of said two sources.

79. A motor control system comprising a motor, a generator supplying the armature of said motor, two independent sources of electromotive force supplying the field windings of said generator and said motor respectively, and means for varying the electromotive forces of said two sources and for reversing the electromotive force of one of said sources.

80. A motor control system comprising a motor, a generator supplying the armature of said motor, two sources of electromotive force supplying the field windings of said generator and said motor respectively, and means for varying the electromotive forces of said two sources and for reversing the electromotive force of the source from which the generator field is energized.

81. A motor control system comprising a motor, a generator supplying the armature of said motor, two exciters excited independently of said generator and supplying the field windings of said generator and said motor respectively, and means for varying the field strengths of said exciters.

82. A motor control system comprising a motor, a generator supplying the armature of said motor, two exciters excited independently of said generator and supplying the field windings of said generator and said motor respectively, and means for varying the field strengths of said exciters and for reversing the field of one of them.

83. A motor control system comprising a motor, a generator supplying the armature of said motor, two exciters supplying the field windings of said generator and said motor respectively, and means for varying the field strengths of said exciters and for reversing the field of the exciter from which the generator field is energized.

84. A motor control system comprising a plurality of motors connected to a common load, a common source of electromotive force supplying the armatures of said motors, a common source of electromotive force supplying the field windings of said motors, and means for varying the field strengths of said motors both individually and collectively.

85. A motor control system comprising an electric motor, separate sources of electromotive force for supplying its armature and its field windings respectively, and means for varying the electromotive forces of both of said sources and for reversing the electromotive force of said armature supplying source.

86. A motor control system comprising a motor, a generator supplying the armature of said motor, two exciters supplying the field windings of said generator and said motor respectively, and means for varying the field strengths of said exciters and for reversing the field of one of them.

87. The combination of a plurality of generating windings having separately excited field windings, a plurality of electric motors acting jointly upon a common load, the armatures of which motors are connected in series with each other and are supplied from said generating windings, means for varying and reversing the voltage supplied by said generating windings for varying the speed and reversing the direction of rotation of said motors, and means for separately exciting a field winding of each of said motors.

88. An alternating current supply circuit, rotary energy converting means supplied therefrom and producing a unidirectional current, a dynamo armature mechanically connected with said rotary means, a separately excited field winding for said dynamo armature, and means for reversing the current in said field winding.

89. A multiple unit control system comprising a source of electromotive force upon each unit, means for varying the electromotive force of any one of said sources, a control circuit adapted to be supplied with energy from any one of said sources, and electroresponsive means upon each of said units connected with said control circuit.

90. A multiple unit control system comprising a source of energy located upon each of the units, a control circuit adapted to be supplied by any one of said sources, means for changing at will the voltage impressed by any one of said sources upon said control circuit, and means responsive to such change of voltage for controlling the multiple unit system.

91. A motor control system comprising in addition to the motor controlled, an electromagnetic device, a control circuit, a separate source of electromotive force for said control circuit, and means for reversing the electromotive force impressed upon said circuit by said source and thereby reversing the direction of rotation of the motor.

92. A plurality of vehicles in a train, a propelling motor upon each vehicle, a source of electromotive force upon each vehicle for supplying the armature of its propelling motor, means for leading control energy along the train, and a separate variable source of energy on the train for supplying energy to said means.

93. A motor control system comprising a source of alternating current energy, an alternating current circuit leading therefrom, an electric motor, energy transforming means adapted to receive energy from said circuit and deliver energy to a winding of the motor, a control circuit, a separate source of electromotive force supplying said control circuit, and means for changing the electromotive force supplied by said source to said circuit.

94. A supply circuit, a plurality of motors acting on a common load, a control circuit, a separate source of energy for said control circuit, means for changing and also reversing the voltage supplied by said source to said control circuit, and means controlled by said control circuit for controlling the motors.

95. An alternating current supply circuit, an electric motor, an energy transformer supplying energy to a winding of said motor, and motor controlling means comprising an additional energy transformer.

96. An alternating current supply circuit, an electric motor, an energy transformer supplying energy to a winding of said motor, an additional energy transforming device, and controlling means functionally related to said additional device for controlling the energy supplied to said motor winding.

97. The combination of a generator having a separately excited field winding, means for varying the current in said field winding, a plurality of motors having their armatures connected with the armature of said generator, means for exciting a field winding of each of the motors independently of the tension of the armature circuit, and means for varying the field excitation of each of the motors independently of the field excitation of the other motors.

98. A plurality of sources of electromotive force each having a generating winding for supplying electric energy to a local circuit of each winding respectively, a plurality of sets of electric motors, each set being supplied with energy from its respective generating winding and having a winding of each motor of each set connected in its respective local circuit, means for connecting said motor windings of each set in series and in parallel, and means for simultaneously varying the electromotive force of said generating windings.

99. A stationary source of electromotive force, a self-propelled vehicle supplied with energy from said source, means on the vehicle for transforming energy, a propelling motor supplied with energy derived from said means, and additional means on the vehicle for transforming energy for controlling the propulsion of the vehicle.

100. In a train control system, means for developing upon the train by magnetic induction a plurality of different voltages, a plurality of self-propelling units in the train, two propelling motors on each of such units, a control circuit extending to each of said units, and means controlled by said circuit for controlling the supply of different voltages from said first named means to the group of two motors of each unit and for coupling the motor armatures of each unit in series and in parallel with each other.

101. A plurality of self-propelling vehicles coupled to form a train, a stationary source of electric energy therefor, a moving contact device on each of said vehicles, an energy transformer on each of said vehicles, two tractive motors on each of said vehicles and controlling means on each of said vehicles for controlling the movement of the several vehicles as a train and for connecting the motors of each vehicle in series and in parallel with each other.

102. The combination of a motor generator, a plurality of motors having armatures connected to the generator armature of said motor generator, a separate source for supplying a field winding of each of said motors, and controlling apparatus for varying the field strength of the generator of said motor generator and for varying the excitation of the motor fields.

103. In a multiple unit train control system, the combination with a plurality of locomotive units of driving motors for said units, energy conveying means extending between the units, and means for controlling the direction of rotation and the speed of said motors by reversing and varying the energy produced and supplied to said conveying means.

104. The combination with a plurality of self-propelling units of a driving motor for each of said units, electromagnetic means upon each of the units for controlling the motors, a separate source of current upon each of said units for supplying current for the operation of said electromagnetic means, and manually controlled means comprising a circuit extending between the units for simultaneously controlling the operation of said electromagnetic means.

105. The combination of a generator having a separately excited field winding, a plurality of electric motors working on a common load and whose armatures are supplied with energy from said generator, the armatures of said motors being connected in series with each other and with said generator, and each of said motors having a field winding which is separately excited.

106. The combination of a generator having a separately excited field winding, a plurality of electric motors working on a common load and whose armatures are supplied with energy from said generator, the armatures of said motors being connected in series with each other and with said generator, each of said motors having a field winding which is separately excited, and means for reversing the direction of rotation of the motors.

107. The combination of a generator having a separately excited field winding, a plurality of electric motors working on a common load and whose armatures are supplied with energy from said generator, the armatures of said motors being connected in series with each other and with said generator, each of said motors having a field winding which is separately excited, and means for simultaneously varying the field strength of said motors.

108. The combination of a generator having a separately excited field winding, a plurality of electric motors working on a common load and whose armatures are supplied with energy from said generator, the armatures of said motors being connected in series with each other and with said generator, each of said motors having a field winding which is separately excited, and means for simultaneously varying the field strength of said motors and for reversing the direction of rotation of said motors.

109. The combination of a generator, said generator having a separately excited field winding, a plurality of electric motors working on a common load, and means for varying the field strength of said generator and for connecting the said motors in series or in parallel.

110. The combination of a generator, said generator having a separately excited field winding, a plurality of electric motors working on a common load, and means for varying the field strength of said generator, for connecting the said motors in series or in parallel with each other and for simultaneously varying the field strength of said motors.

111. The combination of an electric generator, a plurality of electric motors whose armatures are connected in series with the armature of said generator, and means for exciting the field of said generator independently of the electromotive force of said generator and for simultaneously varying the field strength of said motors independently of the current in the motor armatures.

This specification signed and witnessed this 17th day of March 1902.

H. WARD LEONARD.

Witnesses:
J. L. KEBLER,
HARRY F. DAVIDSON.

Copies of this patent may be obtained for five cents each, by addressing the "Commissioner of Patents, Washington, D. C."